Patented May 4, 1954

2,677,638

UNITED STATES PATENT OFFICE 2,677,638

COMPOSITIONS FOR TREE THERAPY

Frank L. Howard, Kingston, Nestor E. Caroselli, Providence, and Albert W. Feldman, Saunderstown, R. I.; said Caroselli assignor to F. A. Bartlett Tree Expert Company, Stamford, Conn., a corporation of Connecticut; said Howard and said Feldman assignors to The Board of Trustees of Rhode Island State Colleges, Providence, R. I., a corporation of Rhode Island No Drawing. Application July 2, 1949, Serial No. 102,945

7 Claims. (Cl. 167—14)

This invention relates to a method of inhibiting systemic vascular wilt diseases caused by toxins in trees, including large shrubs. While the invention is here disclosed primarily in its application to the control of the so-called Dutch elm disease of elm trees, it is not specifically limited to the treatment of that disease but is of broader application as indicated.

Two of the present inventors have heretofore pointed out (Patent No. 2,334,556, granted November 16, 1943) that the pathogenic fungus *Phytophthora cactorum* produces a toxin which will travel through the conducting tissue of certain trees, particularly sycamore, Norway maples and beeches, producing the disease known as "bleeding canker"; and that the pathological condition of such trees may be treated by introducing into the conducting tissues, according to the technique disclosed in said patent, a dilute solution of a hydrochloride salt of azobenzene containing an NH₂ group, as therein more specifically described. The present invention is directed to the treatment not only of the fungus above-mentioned, but also the treatment of other fungi, particularly *Ceratostomella ulmi*, the cause of Dutch elm disease, *Fusarium lycopersici*, the cause of solanaceous plant wilts, and *Verticillium spp.* and *Rhizoctonia spp.* the cause of certain other wilts. Our laboratory studies on the physiology of these pathogenes indicate that they produce a toxin, and these studies have led to the development of methods for standardizing toxin production, perfecting rapid bioassay techniques to evaluate therapeutants, determining factors responsible for toxin formation, and learning something about the complex nature of the toxic principle. "Toxin," as here used, includes the direct and/or indirect metabolic products, resulting from the action of a microorganism on or in a living or dead substrate, which exert a deleterious effect on plant tissues or affect the basic physiology of the host so that an abnormal physiological response occurs.

We have produced the toxin of *C. ulmi* in the laboratory by growing the pathogenic fungus in liquid synthetic media adjusted to pH 4.25 with citrate buffer. Greatest yields are obtained when 50 ml. of the inoculated medium contained in 250 ml. flasks are supported on a constantly shaking "table" for 7 days at about 26° C. Synthetic media optimum for toxin production contain glucose as the carbon source, 1-asparagine for nitrogen, yeast extract for B-vitamin complex, citric acid for buffering, and other basic essential ions. The amount of toxin resulting from the metabolism of the fungus is a direct function of the pH of the medium. Assays have shown that up to 500 times more toxin is produced at pH 4.25 than when the medium is adjusted to pH 7.0 with citric acid-sodium hydroxide. Furthermore, there is an irreversible inactivation of the toxin by hydroxyl ions irrespective of the associated cation.

Quantitative determination of the titre of toxins has been obtained by measuring their effect upon the rate of protoplasmic streaming, the respiration of various host tissues by manometric methods, and the wilting of various species of seedlings grown under standardized conditions. The last has proved most satisfactory from the standpoint of simplicity and rapidity of action and permits the screening of a large number of toxin-inactivating chemicals at a series of dosages. This allows evaluation of the concentration necessary for toxin inactivation as well as phytotoxicity of the chemical.

For illustration we here disclose our invention in connection with the treatment of elm trees for the Dutch elm disease caused by *C. ulmi*. Our observations have been validated by practical field demonstration on a large number of elm trees growing on private estates in New York, Pennsylvania, Connecticut and Massachusetts where damage from the Dutch elm disease has been most severe. Some of the trees used in field tests had trunk diameters ranging from 30 to 60" and were growing in soils ranging from pH 4.2 to 5.4.

According to the present invention water, substantially free from undissolved solids and containing in solution certain substances hereinafter mentioned, is introduced into the conducting tissues of an elm tree through the bark thereof. The technique of fluid introduction is similar to that shown in Patent No. 2,334,556—namely, drilling the bark while the bit of the drill is under water, and then without breaking the water-seal inserting a tube into the hole through which the prepared solution can pass into the tree tubes. In this way, stoppage of the tissues by formation of an air bubble is avoided. Furthermore, it is important in carrying out the present invention that the solution introduced into the tree shall be free, or substantially free, or undissolved solids which would block the conducting tissues mechanically. It is not essential that the solution be completely clear of dispersed solids in a fine state of suspension provided these solids are able to be dissolved promptly within the tree tissue without material interruption to the flow of liquids therein. However, we prefer, if the solution is noticeably cloudy, to let the solids settle and decant the clear supernatant liquid before introduction into the tree.

The watery solution, according to the present invention in its broadest sense, preferably but not necessarily contains an approximately saturated solution of calcium hydroxide (Ca(OH)$_2$) and also contains, in solution, either salicyclic acid or the sodium, potassium or calcium salts of salicyclic acid within the concentration range set forth below. To this solution may optionally be added, according to more specific forms of the invention, urea, sugar or sodium nitrite, or combinations of them, at a concentration for each which is not higher than that shown in the paragraphs which follow.

Calcium hydroxide is preferably got into solution by dissolving commercial hydrated lime in water, letting the undissolved solids settle, and decanting the clear supernatant liquid. Calcium hydroxide is sparingly soluble in cold water (about 1 gram per litre). We prefer where possible to use hot water in order to dissolve a larger amount of calcium hydroxide.

Of the group consisting of salicylic acid and its named salts we prefer to use salicylic acid. However, the sodium, potassium and calcium salts thereof may be used instead of the acid, and within approximately the same range of concentration. For a fairly large tree, of say 20-inch trunk diameter at breast height, about 4 gallons of solution will be required. This amount of water (cold) will hold in saturated solution about ½ ounce of calcium hydroxide, and upwards of 1 pound of salicylic acid. While the smaller amount of the acid which we prefer to use in carrying out our invention, namely, about 6 ounces, will readily dissolve in 4 gallons of water, we have found it necessary, when dissolving as much as a pound of acid in 4 gallons, to dissolve the acid separately in a pint of ethyl alcohol. This solution can then be made up to 4 gallons by the addition of water. The named salts of salicyclic acid are dissolved in the same way. A concentration of salicylic acid or the named salts substantially above about 1 pound to each 4 gallons of water will be detrimental to the tree in that it will cause foliage necrosis. Hence, we regard the above-named concentration, which is somewhat approximate, as the upper limit which is permissible in carrying out our invention. The preferred concentration is about 6 ounces per 4 gallons of water. The function of the salicylic acid, or the named salts thereof, is to neutralize the toxin of C. ulmi in a special manner which apparently produces a slow and long-lasting effect. If too little is used, this function is not appreciably performed.

To the foregoing may be added, in solution, one or more of the substances mentioned below, as set forth in the subjoined examples and claims:

(a) *Urea.*—Urea may be added in an amount which does not exceed approximately 1 pound in each 4 gallons of solution. At higher concentrations it will cause burning of young foliage and will be otherwise detrimental to the tree. The preferred amount is about 6 ounces per 4 gallons of water. The function of the urea is to serve as a quick-acting neutralizing agent for the toxin, and also as a metabolite for the tree. If too little is used, these functions are not appreciably performed unless by other means.

(b) *Sugar in the form of sucrose or dextrose.*— We prefer to use ordinary cane sugar (sucrose) because of its cheapness. Sugar may be added to the solution in any amount which will not cause necrosis of the foliage. We have found that the upper limit is about 3.3 pounds per 4 gallons of water, but preferably we use about 1 pound. The function of the sugar is to serve as a metabolite for rapid stimulation of tree growth. If too little is used, this function is not appreciably performed unless by other means.

(c) *Sodium nitrite.*—This substance if present in concentrations materially higher than 6 ounces per 4 gallons of water, will seriously damage the tree. We prefer to use about 4 ounces per 4 gallons. The function of the sodium nitrite is to serve as a powerful and quick-acting neutralizing agent for the toxin and also as a metabolite for the tree. If too little is used, these functions are not appreciably performed unless by other means.

The following are examples of our method:

*Example 1*

In 4 gallons of water we dissolved:

|  | Ounces |
|---|---|
| Calcium hydroxide | ½ |
| Salicylic acid | 6 | and divided this solution into 30 one-pint bottles, this being sufficient for treatment of one 20″ elm tree by the trunk injection method set forth above. A series of trees were treated in this fashion, some before inoculation with *C. ulmi* and some after. Symptoms of the Dutch elm disease were inhibited in 40% of the trees inoculated one week after treatment, and 30% of those inoculated one week before treatment. All of a series of elms growing in similar soil conditions, and inoculated without treatment, were dead or dying within three weeks.

*Example 2*

In 4 gallons of water we dissolved:

| Calcium hydroxide | ounces | ½ |
|---|---|---|
| Salicylic acid | pounds | 1 | and applied the solution as in Example 1. In this case the salicylic acid was first dissolved in a pint of ethyl alcohol, and enough water containing the lime in solution was then added to make the solution up to 4 gallons. Control was achieved in 60% of the trees inoculated a week after treatment, and in 40% of those inoculated a week before treatment.

*Example 3*

In 4 gallons of water we dissolved:

|  | Ounces |
|---|---|
| Calcium hydroxide | ½ |
| Salicylic acid | 6 |
| Urea | 6 | and applied the solution as in Example 1. Control was achieved in 50% of the trees inoculated a week after treatment, and in 40% of those inoculated a week before treatment.

*Example 4*

In 4 gallons of water we dissolved:

| Calcium hydroxide | ounces | ½ |
|---|---|---|
| Salicylic acid | do | 6 |
| Sugar | pounds | 1 | and applied the solution as in Example 1. Control was achieved in 60% of the trees inoculated a week after treatment, and 40% of those inoculated a week before treatment.

*Example 5*

In 4 gallons of water we dissolved:

|  | Ounces |
|---|---|
| Calcium hydroxide | ½ |
| Salicylic acid | 6 |
| Sodium nitrite | 4 | and applied the solution as in Example 1. Control was achieved in 80% of the trees inoculated a week after treatment, and 60% of those inoculated a week before treatment.

*Example 6*

In 4 gallons of water we dissolved:

| | | |
|---|---|---|
| Calcium hydroxide | ounces | ½ |
| Salicylic acid | do | 6 |
| Urea | do | 6 |
| Sugar | pounds | 1 | and applied the solution as in Example 1. Control was achieved in 80% of the trees inoculated a week after treatment, and in 60% of those inoculated a week before treatment.

*Example 7*

In 4 gallons of water we dissolved:

| | | |
|---|---|---|
| Calcium hydroxide | ounces | ½ |
| Salicylic acid | do | 6 |
| Sodium nitrite | do | 4 |
| Sugar | pounds | 1 | and applied the solution as in Example 1. Control was achieved in 80% of the trees inoculated a week after treatment, and in 50% of those inoculated a week before treatment.

We use the word "sub-phytocidal" in the subjoined claims to indicate an amount or concentration of one or more of the dissolved substances hereinabove mentioned below that which will cause necrosis of the foliage tips or of young growth, root injury, leaf browning or killing of tree tissues, or will be otherwise seriously detrimental to the living tissue of the tree. We have set forth herein, expressed as the amount per 4 gallons of solution, the approximate upper limit of concentration for each of these substances respectively, but it will be understood that these upper limits cannot be stated more precisely since they are somewhat approximate in nature, as stated in more detail above.

We have used the expression "control" to mean that symptom development is largely or substantially inhibited over a prolonged period of time, in most cases several weeks or months, indicating that a pronounced beneficial effect has been achieved. We do not claim for our invention that it will, in all cases, achieve an absolute or final "cure" of the Dutch elm disease in every tree to which it is applied. Disease which is already far advanced, especially in trees where a large percentage of the foliage and branches are already seriously affected, apparently cannot be controlled through the use of our invention, though some benefits appear in almost every case. Our invention appears to be chiefly beneficial in the case of trees which have been recently infected, or in which the progress of the disease has not yet become far advanced. Where not more than about 10% of the tops of trees are dead from the Dutch elm disease, our method has apparently caused about 90% of such trees to recover.

We do not intend that our invention shall be limited to the specific examples set forth above, which are merely for purposes of illustrating the best ways known to us for carrying out the invention, but that the same shall be taken and construed as set forth in the subjoined claims.

We claim:

1. An injectable composition of matter for inhibiting vascular wilt diseases caused by toxins in plants consisting of an approximately saturated water solution of calcium hydroxide containing, in solution, at a concentration corresponding to about 6 ounces and not more than about 1 pound thereof on a dry weight basis in four gallons of water, a substance selected from the group consisting of salicylic acid and the sodium, potassium and calcium salts of salicylic acid, the said solution being substantially free of undissolved solids.

2. An injectable composition of matter for inhibiting vascular wilt diseases caused by toxins in plants consisting of an approximately saturated water solution of calcium hydroxide containing, in solution, salicylic acid at a concentration corresponding to about 6 ounces and not more than about 1 pound thereof on a dry weight basis in four gallons of water, the said solution being substantially free of undissolved solids.

3. The composition described in claim 1, also containing in solution urea at a concentration corresponding to about 6 ounces and not more than about 1 pound thereof on a dry weight basis in four gallons of water.

4. The composition described in claim 1, also containing in solution sugar at a concentration corresponding to about 1 pound and not more than about 3.3 pounds thereof on a dry weight basis in four gallons of water.

5. The composition described in claim 1, also containing in solution sodium nitrite at a concentration corresponding to about 4 ounces and not more than about 6 ounces thereof on a dry weight basis in four gallons of water.

6. The composition described in claim 1, also containing in solution urea at a concentration corresponding to about 6 ounces and not more than about 1 pound thereof on a dry weight basis in four gallons of water, and sugar at a concentration corresponding to about 1 pound and not more than 3.3 pounds thereof on a dry weight basis in four gallons of water.

7. The composition described in claim 1, also containing in solution sugar at a concentration corresponding to about 1 pound and not more than about 3.3 pounds thereof on a dry weight basis in four gallons of water, and sodium nitrite at approximately the concentration corresponding to 4 ounces and not exceeding about 6 ounces thereof on a dry weight basis in four gallons of water.

References Cited in the file of this patent

UNITED STATES PATENTS

| Number | Name | Date |
|---|---|---|
| 1,950,068 | Spangenberg | Mar. 6, 1934 |
| 2,205,807 | Bjorksten | June 25, 1940 |
| 2,334,556 | Howard et al. | Nov. 16, 1943 |

FOREIGN PATENTS

| Number | Country | Date |
|---|---|---|
| 237,256 | Great Britain | June 10, 1926 |

OTHER REFERENCES

Horsfall et al.: Phytopathology, volume 32 (1), page 22, January 1942.

"Eine Method der Kunstlichen Baumernahrung," by Dr. Carl Roth, published in Chemiker Zeitung, volume 20 (1896), page 3445.

"Deutsche Botanische Gesellschaft Berichte, volume 30, published 1912, pages 52 to 65, 295 to 305, abstracted in Chemical Abstracts, volume 6, published 1912, pages 1628 and 3446, "Substances Which Protect the Plant Against Freezing."